3,143,532
PROCESS FOR THE MANUFACTURE OF
BEAD POLYMERS
Karl Heinz Kahrs, Frankfurt am Main, Werner Starck, Hofheim, Taunus, Fritz Winkler, Kelkheim, Taunus, and Johann Wolfgang Zimmermann, Frankfurt am Main, Germany, assignors to Farbwerke Hoechst Aktiengesellschaft vormals Meister Lucius & Brüning, Frankfurt am Main, Germany, a corporation of Germany
No Drawing. Filed Dec. 4, 1959, Ser. No. 857,259
Claims priority, application Germany Dec. 24, 1958
1 Claim. (Cl. 260—78.5)

The present invention is concerned with a process for the manufacture of bead polymers.

It is known to produce granular, mostly globular polymers by the so-called bead or suspension polymerization. In said process liquid monomers are dispersed and polymerized, while vigorously stirring, in a suitable medium, mostly water, in which they are insoluble or only sparingly soluble. As catalysts there are advantageously used those which are soluble in the monomers but insoluble in the dispersing medium. The catalysts are dissolved in the monomers prior to the polymerization. In the bead polymerization with water as carrier liquid there are suitable as catalysts particularly peroxides, such as dibenzoyl or ditoluyl peroxide.

As compared with the so-called block polymerization the aforesaid process presents various advantages. On the one hand, the polymers are obtained in a form in which they are easy to handle and which permits a rapid processing, for example dissolution in solvents. On the other hand, products having a high viscosity and a high degree of polymerization and consequently particularly valuable properties can be obtained, which products cannot be produced on an industrial scale by the block polymerization. Finally copolymers can be made from certain monomers which cannot be copolymerized with one another by the block polymerization process. A certain disadvantage of the bead polymerization consists in the fact that small amounts of stabilizing substances such as emulsifiers or salts must be added to the carrier liquid, in the most cases to the aqueous liquor in order to avoid a coalescence of the polymer particles in the course of the polymerization. Said auxiliaries are necessarily adsorbed on the polymer whereby the quality of the polymer and of the products produced therefrom is impaired, for example with respect to the optical clearness, electrical properties and tendency to decomposition and coloration.

Numerous attempts have been made to find for the suspension polymerization suitable emulsifiers or protective colloids which are so effective that they can be used in relatively small amounts so that the polymers are contaminated as little as possible. In the first place watersoluble substances have been used, the action of which consists, above all, in the reduction of the surface tension of water, for example natural and synthetic soaps, alkyl and aryl sulfonates, polyvinyl alcohol, partially saponified polyvinyl esters or water-soluble copolymers of, for example, vinyl esters or styrene, with maleic acid. Although said substances prevent a coalescence of the beads already when used in a relatively small concentration, they possess various disadvantages. As far as electrolytes are concerned, they impair the electrical properties of the polymers. The neutral protective colloids such as polyvinyl alcohols are likewise adsorbed upon the surface of the beads and partially even grafted and cause in the further processing of the polymers with solvents or plasticizers unpleasant turbidities that prevent the polymers from being used for definite purposes or reduce at least the use-value of the polymers.

Furthermore, polymers can be produced by starting the polymerization of the monomer, for example a vinyl ester, in homogeneous phase until a product of a syrupy consistency is obtained and subsequently completing the polymerization discontinuously or continuously while the product is suspended in an aqueous emulsifier solution. In this process, too, an adsorption of the protective colloid cannot be avoided to a satisfactory extent.

It has now been found that water-soluble polyalkylene oxides are excellently suitable as emulsifiers in the bead polymerization, particularly of vinyl esters, the organic acid radicals of which contain 2 to 5 carbon atoms. Suitable emulsifiers according to the invention are polyethylene oxides having a molecular weight in the range from 10,000 to several millions, for example two million, and preferably from 20,000 to 100,000.

Particularly suitable are oxethylated polypropylene oxides containing in the molecule an amount of polyethylene oxide such that the products are water-soluble and furthermore soluble in most plastics, especially polyvinyl esters, and in the solvents generally used for said substances. Products of this kind consist, for example, of polypropylene oxide having a molecular weight in the range from 1,000 to 4,000, and preferably from 1,000 to 2,000 which is oxethylated on both sides to an extent such that 70–90% of ethylene oxide are contained in the molecule. Said substances are well compatible especially with polyvinyl esters. When they are melted, for example, with polyvinyl acetate the polymer remains transparent, which is not the case with the usual protective colloids and emulsifiers. Thus a substantial advantage of the bead polymers obtained with the aforesaid substances is their absolute optical clearness. Since the emulsifiers to be used according to the invention are non-ionic they do not exert a detrimental action on the electric properties of the bead polymers. Consequently they are distinctly superior to the emulsifiers hitherto used in the bead polymerization.

As emulsifiers according to the invention there are furthermore mentioned by way of example; co- and terpolymers of the higher polyalkylene oxides which are rendered water-soluble by oxyethylation, such as co- and terpolymers obtained by the polymerization of at least two alkylene oxides such as isobutylene oxide, epoxybutane, styrene oxide etc. The terminal hydroxyl groups of the aforesaid oxyethylated polyalkylene oxides may be wholly or partially etherified; furthermore there can be used polyalkylene oxides of the kind defined above, the terminal hydroxyl groups of which can be wholly or partially substituted by mono- or polyfunctional amines such as ethylene diamine or hexamethylene diamine, so that products are obtained which correspond, for example to the general Formulae 1 and 3; or the hydroxyl groups of the polyalkylene oxides may be substituted by mono- or polyfunctional carboxylic and sulfonic acid amides according to the general Formulae 2 and 4. The free hydrogen atoms of the amines or amides may be wholly or partially replaced by the corresponding polyalkylene oxides.

FORMULA 1

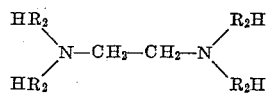

wherein $R_2$ represents one member selected from the group consisting of oxethylated polypropylene oxide and polyethylene oxide.

FORMULA 2

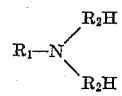

wherein $R_1$ represents a member selected from the group consisting of carboxylic and organic sulfonic acid radicals, for example $CH_3CO-$ or $C_6H_5SO_2-$, and $R_2$ represents at least one member selected from the group consisting of polyethylene oxide and oxethylated polypropylene oxide.

FORMULA 3

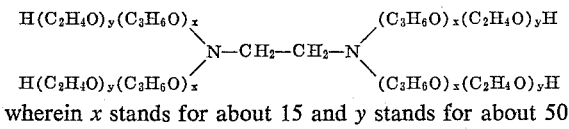

wherein $x$ stands for about 15 and $y$ stands for about 50.

FORMULA 4

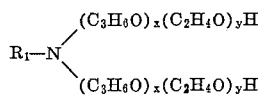

wherein $R_1$ represents a member selected from the group consisting of carboxylic and organic sulfonic acid radicals and wherein $x$ stands for 15 and $y$ stands for 50.

Finally there are suitable water-soluble oxyethylated alcohols containing 4 to 20 carbon atoms and esters of polyhydric alcohols containing 4 to 20 carbon atoms in which only part of the hydroxyl groups is esterified. The said compounds may either be used per se or in any mixture with one another.

The polyalkylene oxides according to the invention are used in an amount of about 0.1 to 3% and preferably 0.2 to 1.5%, calculated on the total weight of the monomers. Since the suitable polyalkylene oxides are soluble in numerous monomers especially in vinyl esters such as vinyl acetate, it is not absolutely necessary to dissolve them in the aqueous bath. The emulsifiers can rather be dissolved in the monomers together with the known catalysts for the bead polymerization which fact presents the advantage that with the progressing polymerization in water the bath only contains an amount of emulsifiers as is required for the forming polymer. Thus the bath foams less than with the known emulsifiers, whereby more favorable space-time yields are obtained. When the polymerization is started as a partial block polymerization with the emulsifier dissolved in the monomer, it is only necessary for the subsequent production of bead polymers to introduce the still pourable product of the partial block polymerization into water and to complete the polymerization under vigorous stirring, whereby a special dissolving vessel for the manufacture of an aqueous emulsifier solution can be dispensed with. With the use of the emulsifiers according to the invention the concentration thereof remains constant throughout the polymerization, calculated on the amount of monomer or polymer contained in the bath for the time being, which fact is of great importance for the uniformity of the products obtained.

The bead polymerization according to the invention cannot only be used for vinyl esters, such as vinyl acetate and vinyl propionate, but also for all polymerizable unsaturated compounds such as styrene and the derivatives thereof, acrylic and methacrylic acid esters, acrylonitrile, vinyl chloride, vinylidene chloride, butadiene. It is of special advantage, however, to use vinyl acetate. The process of the invention is furthermore suitable for the copolymerization of different vinyl esters with one another or of vinyl ester, for example vinyl acetate and vinyl propionate with vinyl chloride, maleic or fumaric acid esters or crotonic acid or for the terpolymerization of, for example vinyl acetate, styrene and maleic acid diethyl ester.

As catalysts there come into consideration free radical catalysts which are soluble in the monomers, for example dibenzoyl peroxide, diacetyl peroxide, azo-diiso-butyronitrile, either alone or in admixture with one another. The catalysts can be used in an amount ranging from about 0.01 to about 10% and preferably in the range from about 0.1 to 1%, calculated upon the weight of the monomers. In some cases organic redox systems such as dibenzoyl peroxide and benzoine have likewise proved to be suitable.

It may be of advantage not to distribute the amount of catalyst uniformly in the monomer but to admix the last introduced monomer amount with a higher quantity of catalyst whereby in many cases coalescence of the beads in the final stage can be avoided. The process is carried out at a temperature in the range from about 65 to about 85° C. It can likewise be carried out at lower temperatures, if desired, under reduced pressure and with the use of a redox system or at higher temperatures and under pressure. The proportion of water or emulsifier solution to monomers shall preferably be 1:1 and not exceed 1:2. It may be suitable to operate in an inert atmosphere, for example, under nitrogen.

The following examples serve to illustrate the invention but they are not intended to limit it thereto; the parts being by weight unless otherwise stated.

*Example 1*

1,000 parts of water in which 15 parts of polyethylene oxide having a molecular weight of 25,000 have been dissolved are introduced into a three-necked flask provided with reflux condenser, thermometer and effective stirrer and the whole is heated to 65° C. by means of a water bath and while intensely stirring (150–200 revolutions per minute). Then 1,000 parts of vinyl acetate containing 6 parts dissolved benzoyl peroxide are allowed to flow in within 1 hour and the polymerization is continued for about a further hour until, with increasing depletion of vinyl acetate, the internal temperature of the reaction mixture rises to 75–80° C. (temperature of the water bath). The beads obtained can be readily filtered off. After having been dried, they yield clear solutions in methanol, ethanol, acetic ester and benzene.

*Example 2*

In the device according to Example 1, 1,000 parts of vinyl acetate containing 7.5 parts of water-soluble graft polymer (molecular weight 5,000) of polypropylene oxide/ethylene oxide and 5 parts of azo-diiso-butyronitrile as catalyst are polymerized as described in the preceding example by introducing the solution within 90 minutes, while vigorously stirring (100–200 revolutions per minute), into 1,000 parts of water and the reaction is continued for 1 hour. Globular or oval beads are obtained which can be readily isolated.

*Example 3*

In an agitator vessel which can be heated by a water bath and is provided with a controllable stirrer, cooler and thermometer, 1,000 parts of vinyl acetate containing in the dissolved state 10 parts of a water-soluble graft polymer (molecular weight about 5,000) of polypropylene oxide/ethylene oxide, 1 part of benzoyl peroxide and 1 part of toluyl peroxide are polymerized until the reaction product has a syrupy consistency. Then 1,000 parts of water are added and the polymerization is terminated while vigorously stirring (100–200 revolutions per minute). Globular or oval beads are obtained which can be readily isolated.

*Example 4*

In a 10 l. three-necked, round-bottomed flask provided with thermometer, reflux condenser and stirrer which is hemispherically bent at the end with a radius of 8 cm. and rotates 200 times per minute 2,500 parts of water containing 25 parts of a dissolved graft polymer (moleucular weight about 5,000) of ethylene oxide on polypropylene oxide are heated on a water bath to 65–70° C. Then there are added by means of a dropping funnel through the condenser and within 150 minutes a solution of 2,425 parts of vinyl propionate, 75 parts of maleic acid diethyl ester and as catalyst 12.5 parts of α,α'-azo-diiso-butyronitrile. Subsequently, the reaction is continued for a further 90 minutes and the temperature is increased at the end to 90° C. The unpolymerized vinyl propionate is removed by steam distillation. The whole is then cooled to room temperature. After having washed and dried, a copolymer is obtained in the form of oval beads or little rods which yield a clear solution in the usual solvents such as alcohols or ethyl acetate.

We claim:

In the method of making bead polymers of vinyl esters, the step which comprises polymerizing at least one vinyl ester of an organic acid having 2 to 5 carbon atoms in an aqueous phase, with agitation, at a temperature of 65–85° C., in the presence of (A) 0.2 to 1.5 percent, by total weight of said ester, of a polyoxyethylated polyoxypropylene having a molecular weight of at least 5,000 and containing sufficient poly(ethylene oxide) to render it water soluble, and (B) 0.01 to 10 percent, by total weight of said ester, of a free radical polymerization catalyst soluble in said ester and dissolved therein.

References Cited in the file of this patent

UNITED STATES PATENTS

| | | |
|---|---|---|
| 2,580,277 | Boyd et al. | Dec. 25, 1951 |
| 2,706,189 | Pruitt et al. | Apr. 12, 1955 |
| 2,840,549 | McNulty et al. | June 24, 1958 |
| 2,956,973 | Holdsworth | Oct. 18, 1960 |
| 3,030,326 | Goldberg | Apr. 17, 1962 |
| 3,036,130 | Jackson | May 22, 1962 |